May 13, 1958 — H. PAPST — 2,834,895
ELECTRIC ROTARY-FIELD SYSTEM
Filed July 8, 1954 — 2 Sheets-Sheet 1
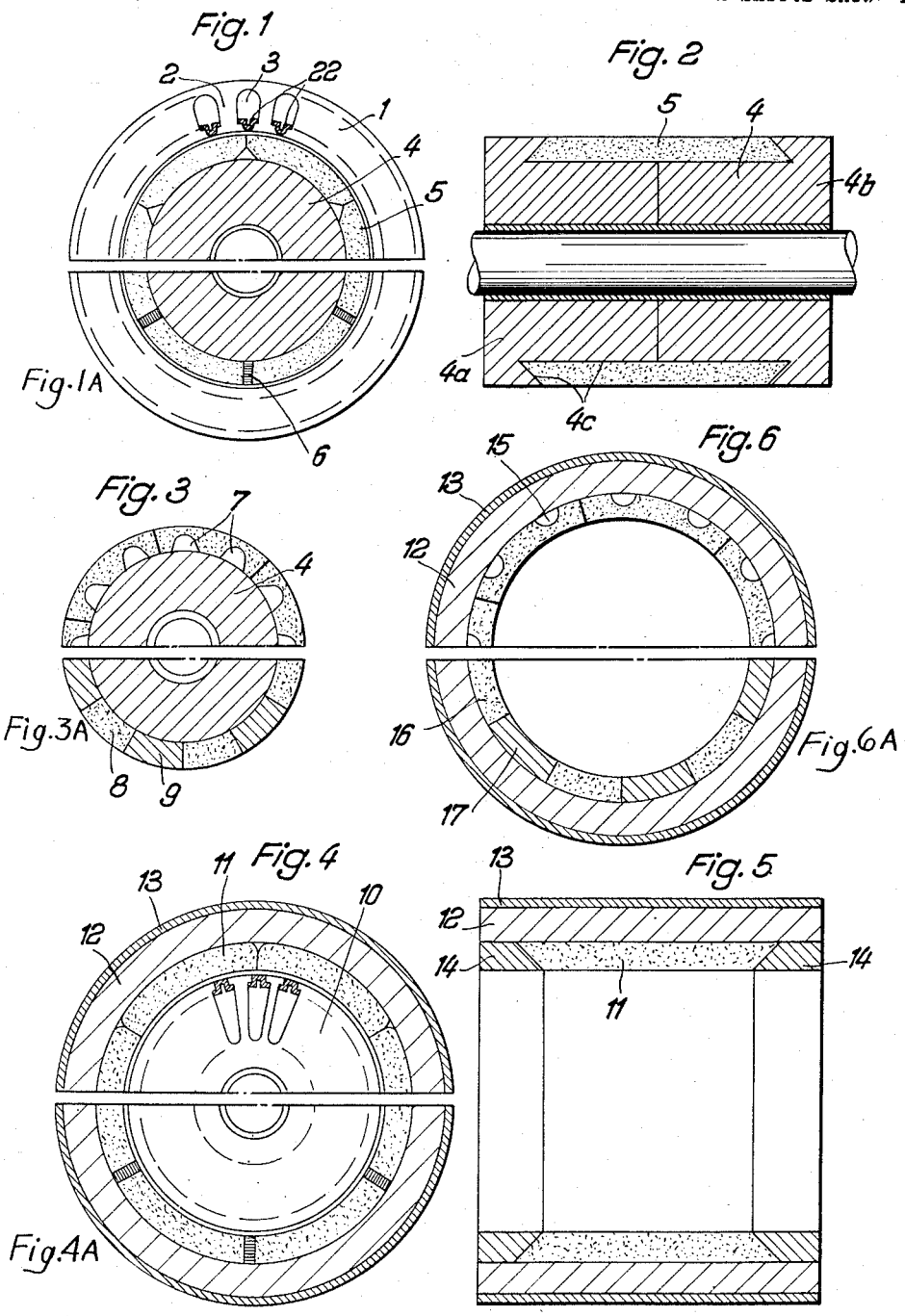
Inventor:
HERMANN PAPST
By J. Wille
ATTORNEY May 13, 1958     H. PAPST     2,834,895
ELECTRIC ROTARY-FIELD SYSTEM
Filed July 8, 1954     2 Sheets-Sheet 2
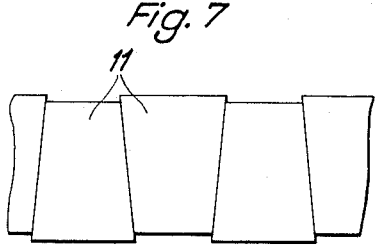
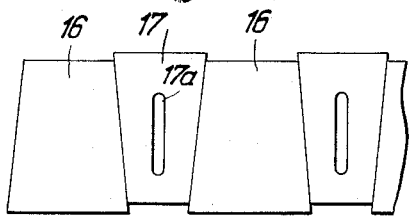
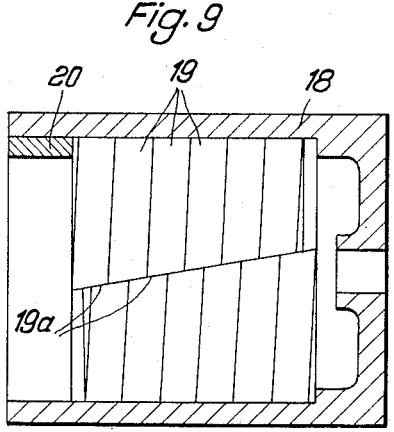
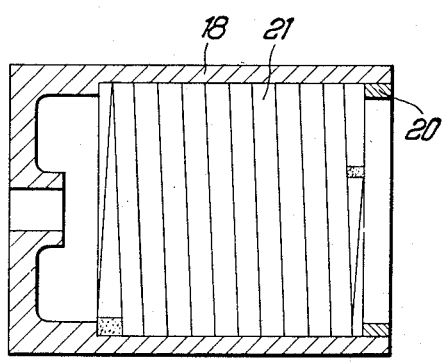
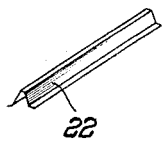
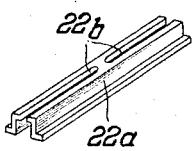
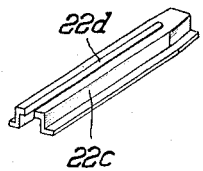
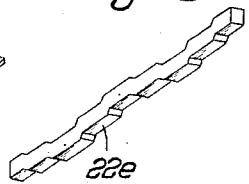
Inventor:
HERMANN PAPST
BY *Atville*
ATTORNEY United States Patent Office 2,834,895
Patented May 13, 1958

2,834,895
ELECTRIC ROTARY-FIELD SYSTEM

Hermann Papst, St. Georgen (Schwarzwald), Germany

Application July 8, 1954, Serial No. 444,055

4 Claims. (Cl. 310—44)

The instant invention relates to rotating field systems in which a primary member, producing the rotating field, and a secondary member, containing hysteretic material, are relatively rotatably in respect of each other. More particularly the invention relates to the manufacture and configuration of particularly the hysteretic portion of the secondary member.

An object of the invention is to simply, accurately and economically manufacture separate hysteretic layers for secondary members of electric rotating field systems by making them of strip material of uniform thickness and disposed on the main or carrier body of the secondary member in various forms.

Another object of the invention is to provide the hysteretic portion of such secondary members in the form of a layer of a plurality of stavelike strips of dimensions and shapes which are wholly independent of the dimensions and shape of the secondary member per se.

Still another object of the invention is to improve the hysteretic synchronous effect in rotating field systems by facilitating the provision of magnetic constrictions in the hysteretic layer of the secondary member parallel to the surface of revolution between the primary and secondary members.

Still another object of the invention is to facilitate the application and fastening of the hysteretic layer to the main body of the secondary member.

Numerous advantages flow from the separate manufacture of the hysteretic layer from strip material. The raw material thereof may readily be pressed, drawn, or rolled and then finish machined giving proper consideration to the structural condition of the material. Further it can readily be appropriately heat treated and subjected to magnetic treatment to enhance its effects in the direction of easy magnetization; and it may be applied to the secondary member in numerous ways such as individual strips or more or less continuous strips in the form of closed rings or of a helix, etc.

The electric rotary-field system according to the invention has many fields of use, principally as a motor, brake, or clutch, in all of which the primary and secondary members may be arranged in very different ways relative to each other. This is so particularly of its use as a motor, because either of the members may be the rotor or the stator and thus form the inner or the outer part of the motor.

If the system is applied to a brake, then either of the two members of the system may constitute the stationary braking member, while the other member is connected to the rotatable mechanism to which the braking force is to be applied.

If the system is applied to a clutch, then one of the two members may be connected to the driving rotary mechanism, whilst the other member is connected to the rotary driven part.

The invention will now be described in more detail with reference to a number of illustrative embodiments illustrated in the accompanying drawing, wherein:

Fig. 1 is a simplified half cross-section of one embodiment of a hysteresis motor with an inner secondary member in accordance with my invention;

Fig. 1A is a simplified half cross-section of a second embodiment of such a motor with an inner secondary member;

Fig. 2 is a longitudinal section through the secondary member of the motor according to Fig. 1.

Fig. 3 is a simplified half cross-section of a third embodiment of an inner and secondary member of a hysteresis motor.

Fig. 3A simplified half cross-section of a fourth embodiment of an inner and secondary member of such a motor.

Fig. 4 is a simplified half cross-section of an outer secondary member of hysteresis motor in accordance with the invention.

Fig. 4A is a simplified half cross-section of a modified outer secondary member of such a motor.

Fig. 5 is a longitudinal section of the secondary member according to Fig. 4.

Fig. 6 is a simplified half cross-section of a further modified outer secondary member of such a motor.

Fig. 6A is a simplified half cross-section of still another modified outer secondary member of such a motor.

Fig. 7 illustrates a developed view of the hysteretic layer of an outer secondary member according to Fig. 4.

Fig. 8 is a developed view of the hysteretic layer of an outer secondary member according to Fig. 6.

Fig. 9 shows a longitudinal section of an outer secondary member, the hysteretic layer being composed of open rings.

Fig. 10 illustrates a cross section, similar to that of Fig. 9, wherein the hysteretic layer consists of a helical strip, and Figs. 11A–D show perspective views of closing wedges for the slot openings between adjacent poles of the primary member.

As shown in Figs. 1, 1A and 2, the motor comprises a primary member 1 which has pole-pieces 2 and slots 3 adapted to receive the field producing winding, and a secondary member consisting of a central carrier 4 and of a hysteretic layer consisting of stavelike segments 5 on the exterior of the carrier and parallel to the motor axis. If the primary member is mounted to form the rotor, then the secondary member constitutes the stator; on the other hand, the secondary member may form the rotor, if the outer primary member is stationary.

As shown in Fig. 2, the carrier consists of two hollow cylinders 4a and 4b which are adapted to be connected together by means of screws and which form a dovetailed annular groove 4c adapted to receive the hysteretic segments 5. However, it is also possible to connect the segments 5 with the carrier or main body 4 by means of screws or by means of a hardening binding agent.

The subdivision of the segments corresponds to a quadruple pole pitch of the primary member 1, so that it is possible to utilise the joints between successive segments of the hysteretic layer as magnetic constrictions thereby assisting the synchronous rotation of the rotary member with the rotary field. As shown in Fig. 1, the magnetic constrictions in the hysteretic layer are produced by a reduction of the layer thickness in the region of the joints. In the modified embodiment shown in Fig. 1A, magnetically non-conductive material 6 is inserted into the partition gaps to form the said magnetic constrictions. A further way of providing the magnetic constrictions is indicated in Fig. 3 which shows grooves 7 extending in an axial direction.

Fig. 3A illustrates the composition of the outer layer of the secondary member of segments 8 consisting of hysteretic material alternating with segments 9 consisting of material with high permeability, e. g. soft iron. In this way the quantity of hysteretic material required can be substantially reduced without substantially decreasing the hysteresis effect.

In the motor shown in Figs. 4, 4A and 5, the primary member 10 forms the inner part of the motor and is surrounded by the secondary member. The secondary member comprises the hysteretic layer which faces the primary member and is composed of segments 11, as well as a cylindrical carrier-body 12 consisting of a magnetically non-conductive material, e. g. aluminum, and a ferro-magnetic outer shell 13. Also with this motor the primary member may form the stator or the rotor, and alternating the secondary member may be the rotor or the stator respectively. The number of segments 11 is adjusted to the pole pitch of the primary member and amounts to the quadruple of the pole pitch. However, it is also possible to use a different pitch for the segments, which may be chosen to form an integral multiple or fraction of the pole pitch.

Figs. 4, 4A, 6 and 6A, indicate the same possibilities for the formation of magnetic constrictions in an outer hysteretic layer as has been explained with reference to Figs. 1, 1A, 3 and 3A in respect of a hysteretic layer mounted on an inner secondary member. The fastening of the hysteretic layer according to Fig. 5 is effected by means of a dovetailed annular groove which is formed by the shell 12 and by the two lateral rings 14. The rings 14 may be fixed to the shell 12 in any convenient manner. If the outer secondary member forms the rotor, the two parts 12 and 13 have to be strong enough to withstand the centrifugal forces involved. The outer shell 13 serves at the same time as a screen which prevents the spreading of leakage fields outwards which might otherwise interfere with magnetic sound recording devices, or devices using electronic tubes.

As shown in Fig. 6 the magnetic constrictions are formed by means of grooves 15. Fig. 6 represents a construction according to which the layer facing the primary member is composed of segments 16 of hysteretic material alternating with segments 17 of material with high permeability, e. g. soft iron.

If the secondary member is used as the outer member of the motor as in Figs. 4 to 6a, the layer, consisting of segments 11 or segments 16 and 17 respectively, may be connected to the cylindrical body 12 by a hardening binding agent instead of the connection shown in Fig. 5. Moreover also in this case the segments may be fastened by wedge action. Such a wedging is shown in the developed representations of Figs. 7 and 8.

Fig. 7 indicates the construction of the hysteretic layer of Fig. 4; the segments 11 are wedge shaped, as shown, and they are so arranged, that the inclination of adjacent edges of succeeding segments is in opposite directions. If the wedge angle is chosen sufficiently small, then a self-locking effect is obtained so that no additional fastening means is required for the fixing of the wedge-shaped segments.

Fig. 8 indicates the construction of the segment layer of Fig. 6a; in this case also the alternating segments 16 and 17 are wedge shaped. In this case it may be advantageous to provide the segments 17, which consist of highly permeable material, with slots 17a extending in the axial direction, which assist in maintaining the synchronous run of the motor. In this case the composition of the segment layer may be such that between each two segments 16 two or perhaps even three segments 17 of material with high permeability are disposed.

Fig. 9 illustrates a construction of the motor casing of another embodiment of the secondary member which may function as a rotor or a stator. The casing is shaped to form a cylindrical container 18 open at one end, and the hysteretic layer accommodated within the container is composed of individual rings 19. The rings are in the form of spring rings and their abutting edges 19a extend obliquely with respect to the axis, so that an expansion of the rings 19 occurs on application of pressure in the axial direction. The axial pressure may be exerted by means of a ring 20 which may be inserted, for instance screwed into, the casing 18.

Fig. 10 illustrates a construction of the casing which serves as a secondary member similar to that of Fig. 9 and, likewise, in the form of a cylindrical container 18 open at one end. Here, the hysteretic layer consists of a helix with closely adjacent windings which is secured to the pot 18 by means of a ring 20.

If the hysteretic layer is constructed as shown in Figs. 9 and 10, then it is advisable to produce the magnetic constrictions in the manner shown in Fig. 6.

In all of the above described embodiments of the secondary member, the hysteretic layer may consist of several concentric layers. In this way it is made possible to obtain an optimum thickness for the hysteretic layer. The use of a starting material of comparatively small thickness facilitates the stock keeping as well as the working of the hysteretic starting material.

As shown in Figs. 1 and 4, the winding slots 3 of the primary member are closed by inserts 22. Differing possibilities for constructing these inserts are shown in Figs. 11A–11D. These inserts consist of magnetic material and they contribute to improve the field distribution within the primary member. Consequently a particularly smooth running of the hysteresis motor is obtained.

In Fig. 11A the insert 22 consists of a strip of V section which is slightly compressed when inserted into the primary member and is thus subjected to an elastic strain. In Fig. 11B the strip 22a is of U section. Resiliency in the circumferential direction, exerted after the insertion of the insert into the winding slot of the primary member, is increased by the provision of slots 22b. The insert 22c of Fig. 11C is shaped similar to that of Fig. 11B but is provided with only one longitudinal slot 22d for increasing the resiliency. The insert 22e shown in Fig. 11D consists of a step-wise off-set rod. The stepping is made in such a manner that the rod obtains an overall wave shaped configuration whereby elastic stressing occurs when the insert 22a is pushed into a slot.

I claim:

1. In an electric rotary apparatus comprising a primary cylindrical member adapted to produce a rotating field and a secondary cylindrical member coaxial with the primary member, the first and secondary members being rotatable relative to each other, a layer of hysteretic material on the surface region of the secondary member adjacent to the primary member comprising a plurality of finite length striplike portions disposed with their longitudinal axes substantially parallel to each other and to the axis of rotation.

2. The layer of hysteretic material according to claim 1 in which the portions of the plurality are cylindrical segments extending in the axial direction, the plurality thereof defining a hollow cylinder.

3. The layer of hysteretic material according to claim 1 in which the portions of the plurality are cylindrical segments, the thickness of each portion is reduced at the axial extending edges thereof to form gaps of magnetic constriction, and the plurality of portions form a hollow cylinder.

4. The layer of hysteretic material according to claim 1 in which the striplike portions of the plurality are arcuate and define a hollow cylinder fitted into a cylindrical recess in the outer wall of the secondary member with the exterior surface flush with that of the secondary member.

References Cited in the file of this patent

UNITED STATES PATENTS

| 917,138 | Robinson | Apr. 6, 1909 |
| 941,180 | Young | Nov. 23, 1909 |

(Other references on following page)

UNITED STATES PATENTS

| | | |
|---|---|---|
| 1,884,140 | Nickel | Oct. 25, 1932 |
| 1,933,498 | Morrill | Oct. 31, 1933 |
| 1,977,185 | Haydon | Oct. 16, 1934 |
| 2,041,875 | Stoller | May 26, 1936 |
| 2,134,795 | Myers | Nov. 1, 1938 |
| 2,183,404 | Morrill | Dec. 12, 1939 |
| 2,221,812 | Nilson | Nov. 19, 1940 |
| 2,295,409 | Kreh | Sept. 8, 1942 |
| 2,433,660 | Granfield | Dec. 30, 1947 |
| 2,449,021 | Stahl | Sept. 7, 1948 |
| 2,695,370 | Brouwer | Nov. 23, 1954 |

FOREIGN PATENTS

| | | |
|---|---|---|
| 714,702 | Germany | Dec. 4, 1941 |
| 899,226 | Germany | Dec. 10, 1953 |